Feb. 24, 1942.　　　E. M. CONNEELY　　　2,274,589

UNIVERSAL NOSE GRIP FOR EYEGLASSES

Filed May 19, 1941

Inventor,
Earl M. Conneely

By [signature]
Attorney

Patented Feb. 24, 1942

2,274,589

UNITED STATES PATENT OFFICE 2,274,589

UNIVERSAL NOSE GRIP FOR EYEGLASSES

Earl M. Conneely, Horseheads, N. Y.

Application May 19, 1941, Serial No. 394,176

3 Claims. (Cl. 88—49)

The present invention relates to improvements in universal nose grips for eyeglasses.

The primary purpose of the invention is to provide a nose grip which is universally mounted so that the nose grip plate may lie in the same plane as the user's nose and may automatically adjust itself to conform to the irregular curvatures thereof.

A further object of the invention is to provide a nose grip piece which may be easily constructed from a single piece of metal forming the socket member to which is attached a piece of imitation pearl or the like providing a nose contacting surface, which is smooth to prevent injury to the skin of the nose.

A further object of the invention is to provide a universal connection between the eyeglass or spectacle and nose piece in which a single piece of metal is provided with a recessed portion which is surrounded with inwardly curved upstanding arms for receiving a spherical ball connecting member, whereby the single sheet metal base member may be adjusted automatically to fit the contour of the user's nose.

Other objects and advantages of the invention will become apparent during the course of the following description, taken with the drawing, wherein, Figure 1 is a perspective view of a nose grip piece for spectacles and eyeglasses illustrating the manner in which the connection is attached thereto;

Figure 1:
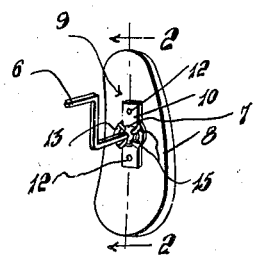
Figure 2:
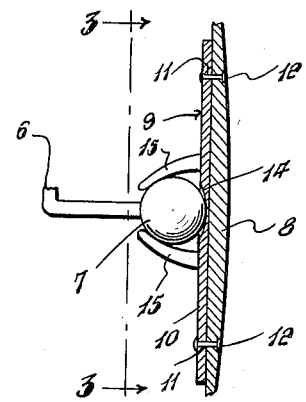
Figure 2 is a vertical cross-sectional view taken on line 2—2 of Figure 1, looking in the direction of the arrows, illustrating in detail the construction of the universal connection between the nose grip pad and the eyeglass frame.
Figure 3:
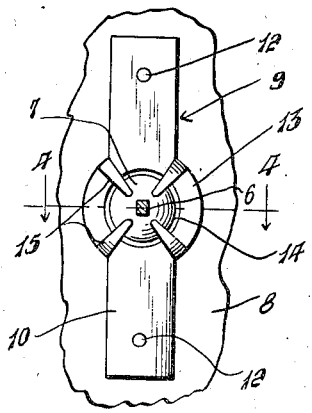
Figure 3 is an enlarged fragmentary detail plan view showing the connector plate and the upstanding arms associated therewith.
Figure 5:
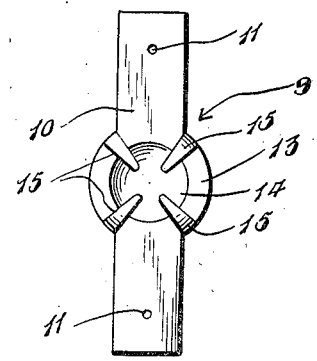
Figure 5 is a top plan view illustrating the connecting plate and showing the recessed central portion surrounded by the upstanding arms.
Figure 4:
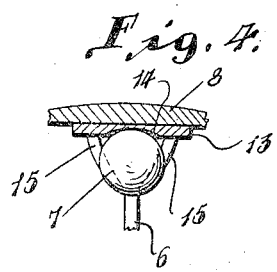
Figure 4 is a transverse cross-sectional view taken on line 4—4 of Figure 3, looking in the direction of the arrows, further illustrating the manner in which the upstanding arms embrace the spherical ball member.

In the drawing, wherein for the purpose of illustrating the invention and wherein like reference characters will be employed to designate like parts throughout the same, the reference character 6 will generally be employed to designate one of the arms of a spectacle or eyeglass nose grip frame portion.

To the end of the frame portion 6, there is secured a spherical connection member 7 upon which the nose grip pad 8 is swiveled for universal movement to cause the pad to assume any position desired when the eyeglasses are placed on the nose.

The invention includes a female socket member interposed between the pad 8 and frame portion 6 and said female socket member 9 comprises an elongated flat metal base portion 10 having apertures 11 adjacent each end thereof for attachment to the nose grip pad 8 by means of rivets or the like.

The central portion of the elongate plate 10 is circular-shaped, as at 13, and is depressed to provide a spherical recess 14.

Formed integral with the plate 10 and at diametrically opposite points, with the circular portion 13, are upstanding arms 15, which are inwardly curved to embrace the spherical ball member 7. The upstanding arms 15 are preferably formed of resilient material so that they will frictionally engage the ball member 7 and prevent accidental displacement of the ball member 7 when the spectacles or eyeglasses are not in use.

When the base plate 9 is formed, as by stamping, the upstanding arms 15 are stamped from the metal to extend radially of the circular portion 13 and after stamping, the arms 15 are bent upwardly to assume the position shown in the drawing and are given a slight curve to more or less conform to the spherical surface of the ball member 7.

It is to be understood that the form of the invention herewith shown and described is to be taken as the preferred embodiment of the same and that various changes in the shape, size and arrangement of parts may be resorted to without departing from the spirit and scope of the invention as claimed.

I claim:

1. A nose grip connection for eyeglasses comprising a spherical ball member formed on the eyeglass frame, a flat metal plate having integral inwardly curved upstanding arms at the edge thereof adapted to embrace the spherical ball member and a nose grip attached to the flat metal plate.

2. A nose grip connection for eyeglasses comprising a spherical member carried by the eyeglass frame, an elongated plate having a circular central portion provided with a recess, upstanding inwardly curved resilient arms integral with the circular central portion and formed on the edge of the plate to embrace the spherical member, and a nose grip pad attached to the metal plate.

3. A nose grip connection for eyeglasses comprising a spherical member carried by the eyeglass frame, an elongated plate having a circular central portion provided with a recess, upstanding resilient arms integral with the plate and formed on the central circular portion and curved inwardly for normally overlying the recess for embracing the spherical member and a nose grip pad attached to the elongate plate.

EARL M. CONNEELY.